(12) United States Patent
Lancaster (10) Patent No.: US 11,301,906 B2
(45) Date of Patent: Apr. 12, 2022

(54) METHOD AND SYSTEM FOR DIGITAL MARKETING AND THE PROVISION OF DIGITAL CONTENT

(71) Applicant: BRANDACTIF LTD., Easingwold (GB)

(72) Inventor: Peter Gerard Lancaster, Singapore (SG)

(73) Assignee: BRANDACTIF LTD., Easingwold (GB)

(*) Notice: Subject to any disclaimer, the term of this patent is extended or adjusted under 35 U.S.C. 154(b) by 0 days.

(21) Appl. No.: 17/097,970

(22) Filed: Nov. 13, 2020

(65) Prior Publication Data

US 2021/0279773 A1 Sep. 9, 2021

Related U.S. Application Data

(63) Continuation of application No. 16/865,109, filed on May 1, 2020.

(30) Foreign Application Priority Data

Mar. 3, 2020 (SG) .......................... 10202001898S (51) Int. Cl.
*G06Q 30/02* (2012.01)
*H04H 60/37* (2008.01)
(Continued)

(52) U.S. Cl.
CPC ......... *G06Q 30/0271* (2013.01); *H04H 20/38* (2013.01); *H04H 20/93* (2013.01); *H04H 60/37* (2013.01); *H04N 21/2668* (2013.01); *H04N 21/26258* (2013.01); *H04N 21/4415* (2013.01); *H04N 21/44204* (2013.01);
(Continued)

(58) Field of Classification Search
None
See application file for complete search history.

(56) References Cited

U.S. PATENT DOCUMENTS 5,188,624 A 2/1993 Young, Sr. et al.
5,661,517 A 8/1997 Budow et al.
(Continued)

FOREIGN PATENT DOCUMENTS

CN 101600118 B 9/2012
CN 106127469 A 11/2016
(Continued)

*Primary Examiner* — Ricky Chin
(74) *Attorney, Agent, or Firm* — Manatt, Phelps & Phillips LLP (57) ABSTRACT

A system and method facilitate digital marketing for media including analog radio. The system allows a user, using an application on a computing device while a piece of content is being broadcast, to express an interest in the broadcast piece of content and the interest of the user is communicated to a backend system. The backend system selects an end point destination associated with the broadcast piece of content wherein the end point destination is a pointer to further digital information about the broadcast piece of content and the user can access the further digital information about the broadcast piece of content using the computing device. In an embodiment, the system and method may be used for analog or digital radio broadcasts.

21 Claims, 8 Drawing Sheets

(51) Int. Cl.

| | | |
|---|---|---|
| *H04H 20/38* | (2008.01) | |
| *H04H 20/93* | (2008.01) | |
| *H04N 21/442* | (2011.01) | |
| *H04N 21/4415* | (2011.01) | |
| *H04N 21/81* | (2011.01) | |
| *H04N 21/858* | (2011.01) | |
| *H04N 21/262* | (2011.01) | |
| *H04N 21/478* | (2011.01) | |
| *H04N 21/2668* | (2011.01) | |
| *H04N 21/47* | (2011.01) | |
| *H04N 21/4722* | (2011.01) | |

(52) U.S. Cl.
CPC . *H04N 21/44213* (2013.01); *H04N 21/44222* (2013.01); *H04N 21/47* (2013.01); *H04N 21/4722* (2013.01); *H04N 21/47815* (2013.01); *H04N 21/812* (2013.01); *H04N 21/858* (2013.01); *H04N 21/8586* (2013.01)

(56) References Cited

U.S. PATENT DOCUMENTS

| | | | |
|---|---|---|---|
| 5,854,894 | A | 12/1998 | Lancaster et al. |
| 6,175,663 | B1 | 1/2001 | Huang |
| 6,587,599 | B1 | 7/2003 | Huang |
| 6,826,727 | B1 | 11/2004 | Morh et al. |
| 6,914,593 | B2 | 7/2005 | Lapstun et al. |
| 7,030,642 | B2 | 4/2006 | Butsch et al. |
| 7,406,603 | B1 | 7/2008 | MacKay et al. |
| 7,466,444 | B2 | 12/2008 | Silverbrook et al. |
| 7,495,795 | B2 | 2/2009 | Graham et al. |
| 7,739,583 | B2 | 6/2010 | Barrus et al. |
| 7,746,498 | B2 | 6/2010 | Lapstun et al. |
| 7,812,986 | B2 | 10/2010 | Graham et al. |
| 7,930,642 | B1 | 4/2011 | Gerde et al. |
| 7,962,691 | B2 | 6/2011 | Nishihara |
| 7,982,898 | B2 | 7/2011 | Lapstun et al. |
| 7,991,778 | B2 | 8/2011 | Hull et al. |
| 8,090,628 | B2 | 1/2012 | Shinohara et al. |
| 8,156,427 | B2 | 4/2012 | Graham et al. |
| 8,271,413 | B2 | 9/2012 | Agarwal et al. |
| 8,310,985 | B2 * | 11/2012 | Harb ...................... G06Q 30/02 370/328 |
| 8,332,401 | B2 | 12/2012 | Hull et al. |
| 8,335,789 | B2 | 12/2012 | Hull et al. |
| 8,385,660 | B2 | 2/2013 | Moraleda et al. |
| 8,390,648 | B2 | 3/2013 | Ptucha et al. |
| 8,438,485 | B2 | 5/2013 | Kulis et al. |
| 8,601,526 | B2 | 12/2013 | Nishimuyra et al. |
| 8,635,531 | B2 | 1/2014 | Graham et al. |
| 8,681,243 | B2 | 3/2014 | Nozaki et al. |
| 8,682,722 | B1 * | 3/2014 | Des Jardins ....... H04N 21/2668 705/14.49 |
| 8,797,604 | B2 | 8/2014 | Hannaway et al. |
| 8,843,963 | B2 | 9/2014 | Boylan, III et al. |
| 8,867,106 | B1 | 10/2014 | Lancaster |
| 9,036,043 | B2 | 5/2015 | Segal |
| 9,092,291 | B1 | 7/2015 | Adib et al. |
| 9,219,840 | B2 | 12/2015 | Ashbrook et al. |
| 9,223,782 | B2 | 12/2015 | Ashbrook et al. |
| 9,319,640 | B2 | 4/2016 | Ptucha et al. |
| 9,332,302 | B2 | 5/2016 | Briggs |
| 9,338,493 | B2 | 5/2016 | van Os et al. |
| 9,363,448 | B2 | 6/2016 | Segal |
| 9,418,294 | B2 | 8/2016 | Ashbrook et al. |
| 9,448,625 | B2 | 9/2016 | Kobayashi |
| 9,652,783 | B2 | 5/2017 | Roberts et al. |
| 9,656,492 | B2 | 5/2017 | Leynadier et al. |
| 9,659,313 | B2 | 5/2017 | Tsai et al. |
| 9,715,629 | B2 | 7/2017 | Ashbrook et al. |
| 9,754,623 | B2 | 9/2017 | Lancaster |
| 9,979,758 | B2 | 5/2018 | Duncker et al. |
| 10,120,944 | B2 | 11/2018 | Hu et al. |
| 10,142,687 | B2 | 11/2018 | Gurha |
| 10,158,722 | B2 | 12/2018 | Eschbach et al. |
| 10,231,033 | B1 * | 3/2019 | Bumgarner .......... H04N 21/242 |
| 10,291,947 | B2 | 5/2019 | Bhatia et al. |
| 10,445,618 | B2 | 10/2019 | Ashbrook et al. |
| 10,504,556 | B2 | 12/2019 | Lancaster |
| 11,069,379 | B2 | 7/2021 | Lancaster |
| 2002/0184091 | A1 * | 12/2002 | Pudar ..................... G06Q 30/02 705/14.62 |
| 2003/0070167 | A1 * | 4/2003 | Holtz .................... G06F 16/958 705/14.69 |
| 2004/0019497 | A1 * | 1/2004 | Volk ................. H04N 21/26258 707/E17.109 |
| 2004/0032424 | A1 * | 2/2004 | Florschuetz ....... H04N 21/8545 348/E7.071 |
| 2004/0047294 | A1 | 3/2004 | Ain et al. |
| 2005/0246590 | A1 | 11/2005 | Lancaster |
| 2006/0080171 | A1 * | 4/2006 | Jardins ............... G06Q 30/0272 705/28 |
| 2007/0288976 | A1 * | 12/2007 | Redling ............. H04N 1/00424 348/E5.006 |
| 2008/0262911 | A1 | 10/2008 | Altberg |
| 2008/0318529 | A1 * | 12/2008 | Harb ..................... H04H 60/82 455/66.1 |
| 2009/0047000 | A1 * | 2/2009 | Walikis ............... G06F 16/4387 386/238 |
| 2009/0061763 | A1 | 3/2009 | Dillon et al. |
| 2009/0150941 | A1 * | 6/2009 | Riedl ............... H04N 21/47202 725/61 |
| 2009/0210790 | A1 | 8/2009 | Thomas |
| 2010/0063931 | A1 * | 3/2010 | Cole .................. G06Q 30/0601 705/51 |
| 2010/0146135 | A1 * | 6/2010 | Evans .................. H04W 4/029 709/231 |
| 2010/0280641 | A1 | 11/2010 | Harkness et al. |
| 2010/0280921 | A1 | 11/2010 | Stone et al. |
| 2010/0286490 | A1 | 11/2010 | Koverzin |
| 2011/0035394 | A1 | 2/2011 | Ashbrook et al. |
| 2011/0247035 | A1 * | 10/2011 | Adimatyam ....... H04N 5/44543 725/39 |
| 2012/0066386 | A1 * | 3/2012 | McGowan ....... H04N 21/26258 709/225 |
| 2012/0072943 | A1 | 3/2012 | Pan |
| 2012/0159327 | A1 | 6/2012 | Law et al. |
| 2012/0173388 | A1 | 7/2012 | Odinak et al. |
| 2012/0274105 | A1 | 11/2012 | Chen et al. |
| 2012/0317492 | A1 | 12/2012 | Sheeder |
| 2013/0034147 | A1 | 2/2013 | Ballout |
| 2013/0036007 | A1 | 2/2013 | Lau et al. |
| 2013/0173402 | A1 | 7/2013 | Young et al. |
| 2013/0191749 | A1 * | 7/2013 | Coburn, IV ........... H04N 21/47 715/716 |
| 2013/0254159 | A1 * | 9/2013 | Thramann ......... G06Q 30/0277 707/609 |
| 2014/0036088 | A1 * | 2/2014 | Gabriel ............. H04N 1/00137 348/157 |
| 2014/0164091 | A1 | 6/2014 | Hunt |
| 2014/0198033 | A1 | 7/2014 | Kobayashi |
| 2014/0245346 | A1 * | 8/2014 | Cheng .............. H04N 21/23424 725/32 |
| 2015/0033255 | A1 * | 1/2015 | Neumann ........ H04N 21/25891 725/34 |
| 2015/0149585 | A1 * | 5/2015 | Zhang .................... H04L 51/14 709/217 |
| 2015/0162997 | A1 * | 6/2015 | Francois ................ H04H 20/82 381/80 |
| 2015/0213439 | A1 | 7/2015 | Kramer |
| 2015/0270318 | A1 | 9/2015 | Bhintade |
| 2015/0271234 | A1 * | 9/2015 | O'Malley .......... H04N 21/8456 709/219 |
| 2015/0312302 | A1 * | 10/2015 | Gupta ................... H04L 65/80 709/219 |
| 2015/0358790 | A1 | 12/2015 | Nasserbakht |
| 2016/0094302 | A1 * | 3/2016 | Berner .................. H04H 60/52 700/94 |
| 2016/0182923 | A1 | 6/2016 | Higgs et al. |
| 2016/0192001 | A1 | 6/2016 | White et al. |
| 2016/0316233 | A1 * | 10/2016 | Ghadi ................... H04N 21/242 |

(56) References Cited

U.S. PATENT DOCUMENTS

| | | |
|---|---|---|
| 2016/0351062 A1 | 12/2016 | Mathews |
| 2017/0200193 A1* | 7/2017 | Bigley |
| 2017/0272816 A1* | 9/2017 | Olds ..................... G06F 21/00 |
| 2018/0035152 A1* | 2/2018 | Jassin .............. H04N 21/23418 |
| 2018/0054639 A1 | 2/2018 | Rosqvist |
| 2018/0122378 A1 | 5/2018 | Mixter et al. |
| 2018/0190264 A1 | 7/2018 | Mixter et al. |
| 2018/0261223 A1 | 9/2018 | Jain et al. |
| 2019/0066190 A1 | 2/2019 | Pedroso et al. |
| 2019/0313135 A1* | 10/2019 | Pathak ............. H04N 21/44016 |
| 2020/0104844 A1 | 4/2020 | Herrington et al. |
| 2020/0111508 A1 | 4/2020 | Lancaster |
| 2020/0242585 A1 | 7/2020 | Meere et al. |
| 2021/0044863 A1* | 2/2021 | Haifa .................. H04N 21/858 |

FOREIGN PATENT DOCUMENTS

| | | |
|---|---|---|
| CN | 103905846 B | 12/2017 |
| EP | 1847112 B1 | 6/2013 |
| GB | 2370456 | 6/2002 |
| WO | WO2002082351 A1 | 10/2002 |
| WO | WO2005/039080 A1 | 4/2005 |

\* cited by examiner

METHOD AND SYSTEM FOR DIGITAL MARKETING AND THE PROVISION OF DIGITAL CONTENT

RELATED APPLICATIONS

This application is a continuation of U.S. application Ser. No. 16/865,109, filed May 1, 2020, which claims the benefit of Singapore Patent Application 10202001898S, filed Mar. 3, 2020, all of which are incorporated herein by reference.

FIELD

The disclosure relates generally to a system and method for digital marketing and the provision of digital content. While the present disclosure will be described in relation to its application in relation to analog radio broadcasts. It is to be appreciated that the present disclosure is not z to this application, and is also applicable for other forms of media broadcasts including, but not restricted to, digital radio and analog and digital television broadcasts.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Systems exist that provide personalized offers and advertisements to a user in various manners. However, those systems do not provide personalized offers and advertisements for all of the different types of communications mediums. For example, communication mediums can include radio or television (both over the air and digitally) in which commercials and advertisements are presently orally to each audience member who is listening to a particular radio station or viewing a particular television station. It is desirable to be able to permit each audience member to identify a commercial or advertisement in the broadcast and then provide a personalized offer to that audience member and it is to this end that the disclosure is directed.

DETAILED DESCRIPTION OF ONE OR MORE EMBODIMENTS

The disclosure is particularly applicable to use with analog or digital radio broadcasts and it is in this context that the disclosure will be described. It will be appreciated, however, that the system and method has greater utility and could be used with other types of broadcast systems for pieces of content.

According to an aspect of the present disclosure, there is provided a method, comprising: expressing, by a user using an application executed on a computing device while a piece of content is being broadcast using an analog or digital signal by an analog or digital radio or television station system, an interest in the broadcast piece of content; communicating the interest in the broadcast piece of content to a backend system; selecting, in the backend system, an end point destination associated with the broadcast piece of content, the end point destination being a pointer to further digital information about the broadcast piece of content; communicating, by the backend system to the computing device, end point destination for the broadcast piece of content; and accessing, using the computing device and the end point destination, the further digital information about the broadcast piece of content.

In some embodiments, the method further comprises providing, by a digital marketing system in the backend system connected to the computing device, a personalized offer associated with the broadcast piece of content and displaying, on a display of the computing device, the personalized offer to the user.

In some embodiments, the method further comprises providing a playlist for the broadcast by the analog or digital radio or television station system to the backend system, the playlist having one or more discrete pieces of content and storing, in the backend system, an association of each discrete piece of content in the broadcast with a particular end point destination. Providing the playlist may further comprise providing, for each discrete piece of content in the broadcast, a start time and an end time for each discrete piece of content.

In some embodiments, the method further comprises activating the end point destination for each discrete piece of content at the start time for each discrete piece of content in the playlist and deactivating the end point destination for each discrete piece of content at the end time for each discrete piece of content in the playlist and wherein expressing interest for the broadcast piece of content further comprises expressing interest in the discrete piece of content while the end point destination for the discrete piece of content is active.

In some embodiments, the broadcast is selected from a group consisting of an analog broadcast, a streamed broadcast and an archived broadcast.

In some embodiments, the application executed on the computing device is one of a progressive web application (PWA) or an application downloaded to the computing device. In some embodiments, the end point destination is a uniform resource locator (URL) to a webpage having digital information about the broadcast piece of content or content in an application having digital information about the broadcast piece of content. In some embodiments, the application executed on the computing device broadcasts the radio or television signal of the analog or digital radio or television station. In some embodiments, the radio signal of the analog or digital radio or television station is broadcast by a device from the computing device. In some embodiments, the device that broadcasts the radio signal of the analog radio station is a transistor radio.

According to another aspect of the present disclosure, there is provided a system, comprising: an analog or digital radio or television broadcast system that broadcasts a plurality of pieces of discrete content, the analog radio broadcast system having a playlist that has each piece of discrete content being broadcast, a start time and end time for each piece of discrete content; a backend system that receives the playlist and stores an association of each piece of content in the playlist of the broadcast with a particular end point destination; a computing device having a processor and memory that executes an application that has a plurality of lines of code that are executed to: express, by the user while a particular piece of content is being broadcast by the analog or digital radio or television system, an interest in the broadcast piece of content; communicating the interest in the broadcast piece of content to the backend system; the backend system being configured to select an end point destination associated with the broadcast piece of content, the end point destination being a pointer to further information about the broadcast piece of content and communicate the end point destination for the broadcast piece of content to the computing device; and the computing device configured to access the further information about the broadcast piece of content using the end point destination.

In some embodiments, the backend system further comprises a digital marketing system that provides a personalized offer associated with the broadcast piece of content and wherein a display of the computing device displays the personalized offer to the user.

In some embodiments, the backend system activates the end point destination for each discrete piece of content at the start time for each discrete piece of content in the playlist and deactivates the end point destination for each discrete piece of content at the end time for each discrete piece of content in the playlist and wherein the computing device is further configured to express interest for the broadcast piece of content while the end point destination for the discrete piece of content is active.

In some embodiments, the broadcast is selected from a group consisting of a live broadcast, a streamed broadcast and an archived broadcast. In some embodiments, the application executed on the computing device is one of a progressive web application (PWA) an application downloaded to the computing device. In some embodiments, the end point destination is a uniform resource locator (URL) to a webpage having digital information about the broadcast piece of content or content in an application having digital information about the broadcast piece of content. In some embodiments, the application executed on the computing device broadcasts the radio or television signal of the analog or digital radio or television station. In some embodiments, the radio or television signal of the analog or digital or television radio station is broadcast by a device separate from the computing device. In some embodiments, the device that broadcasts the radio signal of the analog radio station is a transistor radio.

According to a further aspect of the present disclosure, there is provided a computing device for interacting with an analog or digital radio or television broadcast system that broadcasts a plurality of pieces of discrete content, the broadcast system having a playlist that has each piece of discrete content being broadcast, a start time and end time for each piece of discrete content, the device comprising: a processor and memory that executes an application that is configured to: express, by the user while the piece of content is being broadcast by the analog or digital radio or television station, an interest in the broadcast piece of content; communicating the interest in the broadcast piece of content to a backend system; receive an end point destination associated with the broadcast piece of content of interest, the end point destination being a pointer to further information about the broadcast piece of content and communicate the end point destination for the broadcast piece of content to the computing device; and access the further information about the broadcast piece of content using the end point destination. In some embodiments, the device is further configured to display a personalized offer to the user. In some embodiments, the device is further configured to express interest for the broadcast piece of content while the end point destination for the discrete piece of content is active. In some embodiments, the analog or digital radio or television broadcast is selected from a group consisting of a live broadcast, a streamed broadcast and an archived broadcast. In some embodiments, the application executed on the computing device is one of a progressive web application (PWA) or an application downloaded to the computing device. In some embodiments, the end point destination is a uniform resource locator (URL) to a webpage having digital information about the broadcast piece of content or content in an application having digital information about the broadcast of content. In some embodiments, the application executed on the computing device broadcasts the radio signal of the analog digital radio station.

The disclosure can be applicable to an analog radio system that uses an application or website to digitally deliver content to a user based on the broadcast analog radio signal with a computing device and a personal offer system that can provide a personal offer using a progressive web application (PWA) to the user based on the pieces of content being broadcast by the analog radio station and it is in this context that the disclosure will be described. It will be appreciated, however, that the system and method has greater utility since: 1) the personalized offer system may be implemented on a computing device using other known or yet to be developed technology in lieu of the progressive web application; 2) the system and method may be used with other types of content other than radio content delivered over the air, and can include digitally delivered radio and television as well as television delivered over the air; and 3) the personalized offer system may be implemented on other devices that are capable to performing the processes described below including a virtual reality device or headset, a pair of glasses with embedded computer functionality and the like. The system and method may also be implemented using an application or mobile application rather than a PWA. Furthermore, the system and method described below may be used with various content broadcasts that may be delivered to a user as a live radio or television broadcast (either over the air or over a computer network), a streaming broadcast, a catch-up service broadcast, a podcast and the like. Furthermore, the system may be used with digital broadcasts or analog broadcasts of content to the user.

The system may for example be used for live radio being played in any location (car, shop, supermarket, etc.), on an analog radio, through a TV channel or through the app/PWA on the computing device. Furthermore, background noise does not affect the efficacy of the system. The system allows a user to listen to an analog radio signal (generated by whatever device) and react/express interest about a piece of content in the broadcast using a PWA or application executing on the computing device (that may or may not being presenting the radio signal to the user) wherein the user is delivered an end point destination to the PWA or application based on the particular piece of content. The end point destination in turn directs the user to further information about the piece of content. Thus, in one embodiment, the system allows the user to listen to an analog radio signal and express interest/react to a piece of content in the analog radio signal and receive a digital marketing message. In a number of countries, a company that owns at least one radio station also owns other media such as television or magazines and the system described herein can be used to provide information about products on the other media using the end point destinations.

Figure 1A:
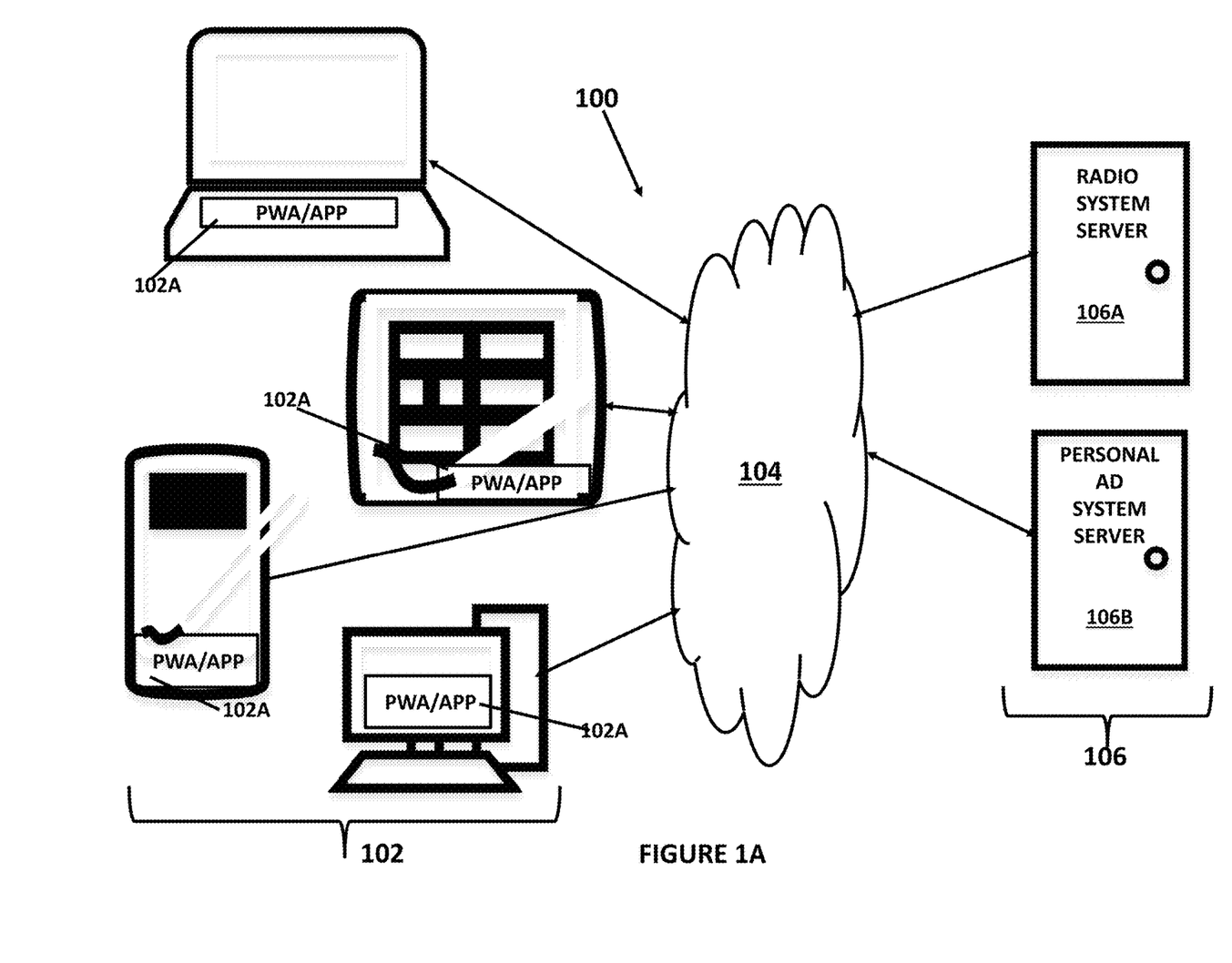
FIG. 1A illustrates an example of a cloud based implementation of an analog radio broadcast content scanner system that facilitates digital marketing.

FIG. 1A illustrates an example of a cloud based implementation of an analog radio scanner system 100 that links, in one embodiment, analogue live radio broadcast (played on a 20 year old transistor radio, for example) to the digital world (and digital marketing) through a PWA or application on a computing device.

The system 100 may have one or more computing devices 102 that may connect to and communicate over a communication path 104 with one or more backend systems 106 in order to provide radio digital marketing so that a user of the computing device 102 may hear a piece of content (commercial, advertorial, public service announcement, newsstory, etc.) broadcast on a radio station (whether over the air or digital or streaming) and the user may indicate an interest in the piece of content currently being broadcast on the radio station. The system may communicate, back to the computing device, an end point destination that is associated with the piece of content, such as one or more personalized details/offers or other information. In this manner, each user of each computing device 102 may listen to a radio station, using the application, and receive the end point destination related to the piece of content of interest to each user. Alternatively, the analog radio signal may be broadcast by a device, such as a radio receiver.

Each computing device 102 may be a processor based device with memory, a display, an input device and connectivity circuits wherein the display may generate and display a user interface (see FIG. 7 for an example) so that the user can indicate interest in a particular piece of content broadcast by the radio stations and display the one or more personalized offers or other information based on the end point destination. The input device of the computing device 102 allows the user to interact with the user interface and the connectivity circuits may permit the computing device to connect and communicate wirelessly or over a wired line with the backend systems 106. For example, each computing device 102 may be a laptop computer, a tablet computer, a smartphone device, such as an Apple iPhone or an Android OS based device or a personal computer as shown in FIG. 1A. To interact with the radio station to indicate the interest in the piece of content, receive the end point destination and follow the end point destination, each computing device may have an application 102A that is a plurality of lines of instructions or computer code that are stored in the memory of the computing device and executed by the processor to generate the user interface as described below. Each application may be a mobile application or other application. In one embodiment, each application 102A may be a branded Radio Station App/progressive web app (PWA) that may be available, for example, on Android Auto/Apple Car Play. In one embodiment, the computing device 102 may be a processor based device that has limited capabilities, but does have access to the Internet and the system allows the user of this limited capability device to indicate an interest in content on the radio and receive digital marketing as a result of that expressed interest. For example, many computing devices 102 in India are feature phones that have limited capabilities, such as no ability to download apps, but has internet access and thus can use the PWA to indicate an interest in content on the radio and receive digital marketing as a result of that expressed interest.

The communication path 104 may be a wired link or a wireless link or a combination thereof that uses known communication and data transfer protocols that allow each computing device 120 to connect to and communicate with the backend systems 106.

The backend systems 106 may include one or more computing resources, such as a server computers, blade servers, cloud computing resources, etc. In more detail, the backend systems 106 may include, in an embodiment in which the radio is digital or streamed, one or more radio system servers 106A that deliver a broadcast (such as digital or analog radio or a stream) to each computing device 102 and more specifically to an app 102A. Each radio system server 106A may be owned by a third party and the system can provide its service to a plurality of radio systems 106A. Alternatively, the radio station system may be an analog radio station system that broadcasts via a transmitter the radio program over the air to listeners. The backend system 106 may further include a personal ad system server 106B that: 1) receives the interest indication from each user of each computing device; 2) selects the end point destination (such as customized offers) for each user based on the interest indication; 3) delivers the end point destination to the user; and 4) permits the user to access the end point destination as described below. The further information resulting from the end point destination, such as one or more customized offers, may be displayed to the user on the app 102A or via a dynamic web page such as using a PWA.

Figure 1B:
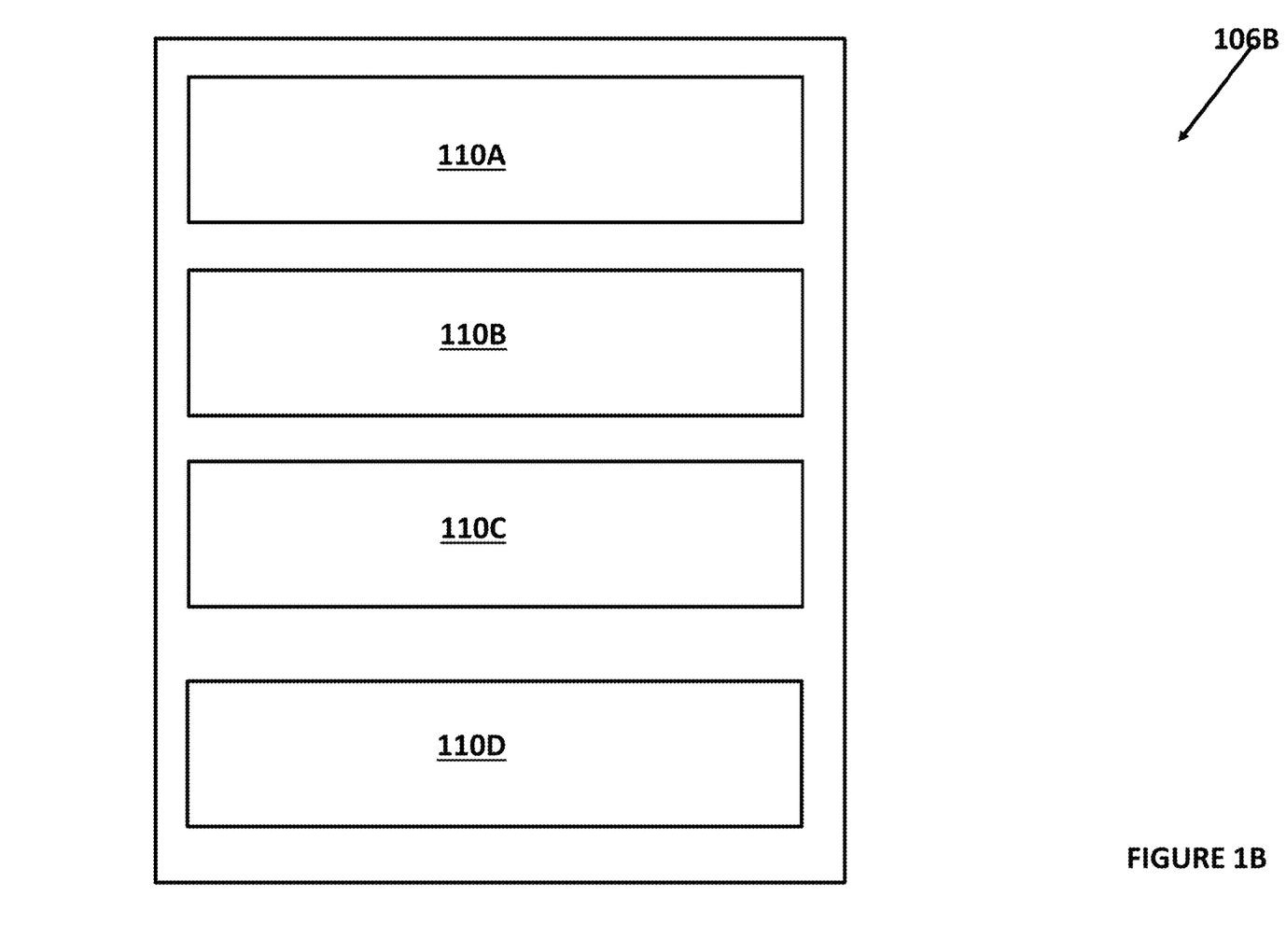
FIG. 1B illustrates more details of the preferred implementation of the personal ad system shown in FIG. 1A.

FIG. 1B illustrates more details of the preferred implementation of the backend system 106B shown in FIG. 1A. In a preferred implementation, the backend 106B may have a presentation layer 110A that interfaces with each user of the system, a network layer 110B that handles the well known and understood network logistics such as load balancing and firewalls and a business layer 110C and a data layer 110D that implement the main processes of the radio advertising system. Each of the layers may be implemented using Amazon web systems (AWS) elements. It is understood that the system and method described below are in no way limited to the architecture shown in FIG. 1B. As shown in FIG. 1B, each user (using an application, mobile application or PWA on a computing device 102) may hear a piece of content in a radio broadcast and interact with the backend 106B through the presentation layer 110A. When the user expresses an interest in a particular piece of content being broadcast by the radio station, the PWA or application may generate data that is sent to the backend system 106B that identifies the radio station performing the broadcast and the content.

The data for each user as a result of the interaction with the backend 106B may be passed onto the network layer 110B that has the well known load balancer and firewall (provided by AWS) that are not described further here. The business layer 110C may contain the various plurality of lines of code/instructions that perform the processes of the backend 106B. The data layer 110D may store the data used by the backend 106B including user data, data about each broadcast, such as playlist, data about the URL/links to content interacted with by a user and other content.

Each broadcast system 106A shown in FIG. 1A interacts with the backend system 106B using an application programming interface (API). Each broadcast system 106A may have a key, such as an API key, that allows the broadcast system 106A to interact with the backend system 106B. In one embodiment, there may be an allocated unique key per broadcaster/station that may be stored in multiple apps/PWAs, but each station has its own unique identifier so that, for example, there could be a BBC radio scanner, but they have about 15 radio stations. In order to implement the content interacting system provided by the backend 106B, each broadcast system 106A using the key may upload the programme/playlist for the particular broadcast system wherein the programme/playlist may include the archived broadcasts of the broadcast system so that the interaction system provided by the backend 106B may be utilized for both the active broadcasts and the archive broadcasts. Using the API key, each piece of broadcast content may have a time marker to denote the beginning of the programme (see examples in FIGS. 2A-2C) and a monitor within the app/PWA to determine when the live broadcast is paused. The time marker may be located in the audio file itself that the API key will identify. Through the app/PWA, from where the file is being played, the system knows the name of the recorded file/programme and when each element of the broadcast starts and ends in granular detail (egg. adverts, interviews, commentary, music etc.).

Figure 2A:
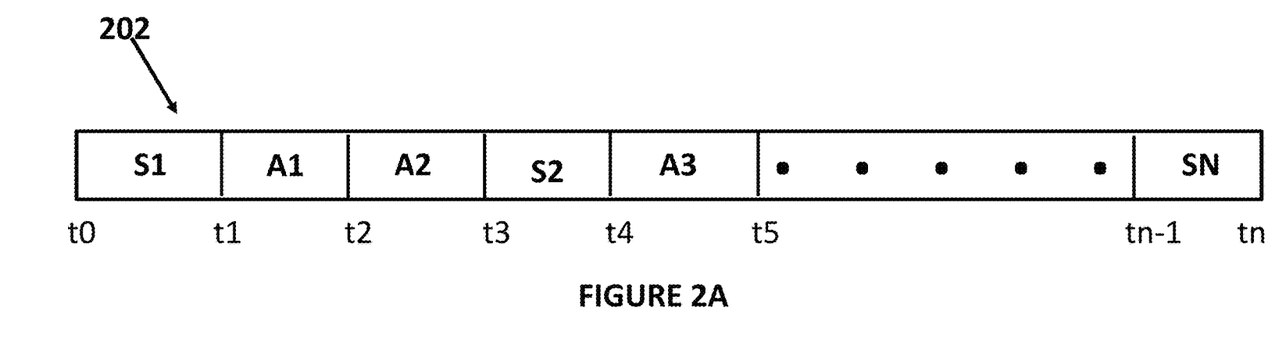
FIGS. 2A-2C illustrate examples of the program/playlists of a broadcast system.
Figure 2B:
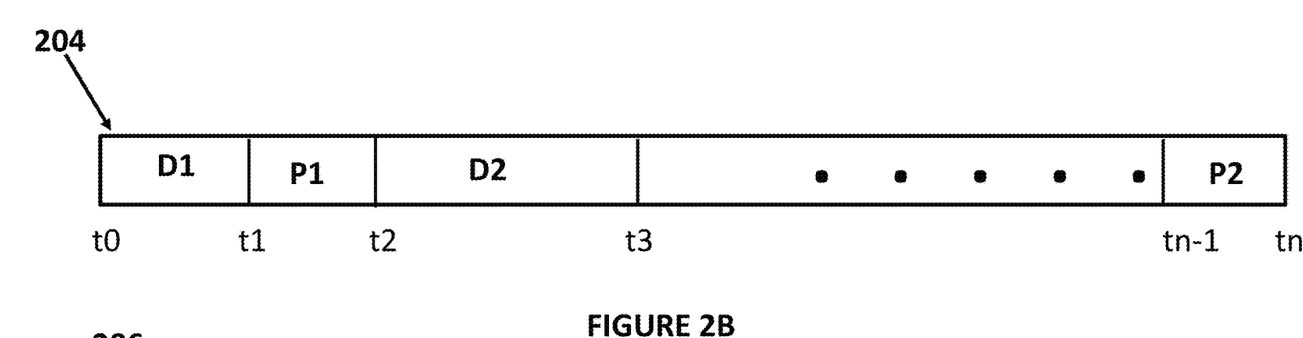
Figure 2C:
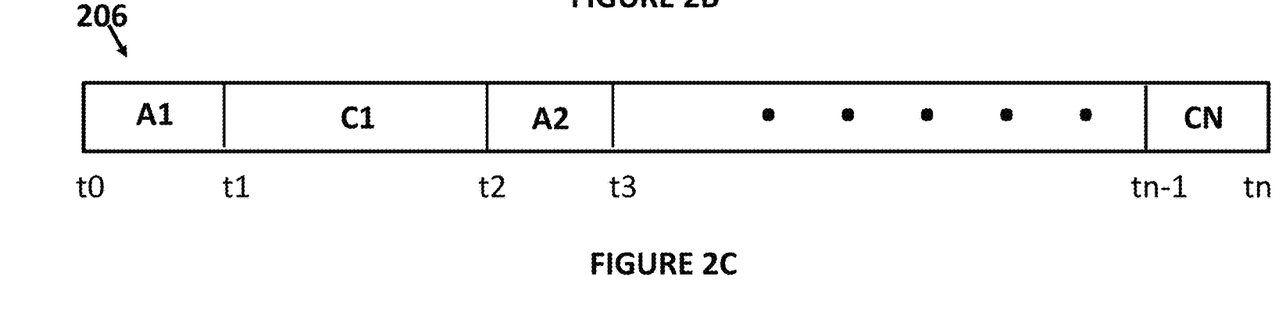

FIGS. 2A-2C illustrate examples of the programme/playlists of a broadcast system. Each playlist programme has one or more piece of content being broadcast and then one or more advertisements/articles/discussions/promotions/sponsor messages that the user can interact with as described below in more detail. FIG. 2A shows a playlist 202 for a music type broadcast system in which one or more songs (S1, S2, . . . , SN) are broadcast along with one or more advertisements (A1, A2, . . . , A3) over a predetermined time of the playlist. In the playlist 202 a start time and an end time for each song and each advertisement is specified so that, for example, the first song starts at t0 and ends at t1 and the first ad starts at time t1 and ends a time t2, etc. Each time in the playlist may be measured in milliseconds. FIG. 2B illustrates a playlist 204 for a talk radio broadcast system that has one or more discussions (D1, . . . , D2) and one or more promotions (P1, . . . , P2) in which the start and end times of each piece of content is known down to the millisecond. FIG. 2C illustrates a playlist 206 for national public radio broadcast system that has one or more pieces of content (C1, . . . , CN) such as news stories or discussions and one or more ads (A1, . . . , A2) in which the start and end times of each piece of content is known down to the millisecond. Note that the backend system 106B allows a user to indicate an interest in the ads, the discussions, the stories, the songs, the promotions, etc. . . . In each of the playlists, each piece of content, such as the songs and ads in FIG. 2A, is a discrete piece of content that has a start time and an end time.

Using the playlists/programmes for each broadcast system 106B, each piece of content being broadcast is identified (including its start and end time) so that each piece of content can be associated/linked to an end point destination and thus each piece of content in the broadcast becomes clickable by the user by interacting with the backend 106B. Thus, all of the broadcast content (including archive content) becomes clickable by a user. In more detail, each piece of clickable content in the broadcast is synchronized with an end point destination (a URL or in-app content) associated with the particular piece of content. For example, an ad for a new Ford Mustang car may have an end point destination that directs the browser of the user to a website with details of the new Ford Mustang car. Alternatively, a newstory about a volcano in Ethiopia may had an end point destination for a travel site to book travel to the Erta Ale region in Ethiopia. Each end point destination may be synchronized to be available to the user to select between the start time and end time of the piece of content in the playlist associated with the end point destination. Thus, the backend 106B is able to provide the end point destinations for the pieces of content based solely on the time when the user expressed their interest in the piece of content. For example, if a particular piece of content was broadcast from 10:00 AM to 10:05 AM and the user expresses an interest at 10:03 AM, the backend 106B knows that the user is expressing an interest in the particular piece of content. Once a particular broadcast system's playlist(s) are loaded into the backend system 106B, a user may interact with the broadcast system content as described in more detail with reference to FIG. 3. The system, due to the playlist, has millisecond precision about when to activate a particular end point destination (when the piece of content, ad, promotion, etc. starts being broadcast) and when to deactivate the particular end point destination (when the particular piece of content's broadcast has ended.) In this manner, the content sent to the computing device of the user (and the app or PWA) is in sync with the live broadcast based on the playlist timing sequences. The system can also handle the playlist being out of synchronization with the live broadcast such as when, for example, an interview last longer than scheduled. In this case, a time correction shift can be performed manually or automatically in real time using various techniques, such as for example audio recognition, to re-synchronize the playlist with the live broadcast.

Figure 3:
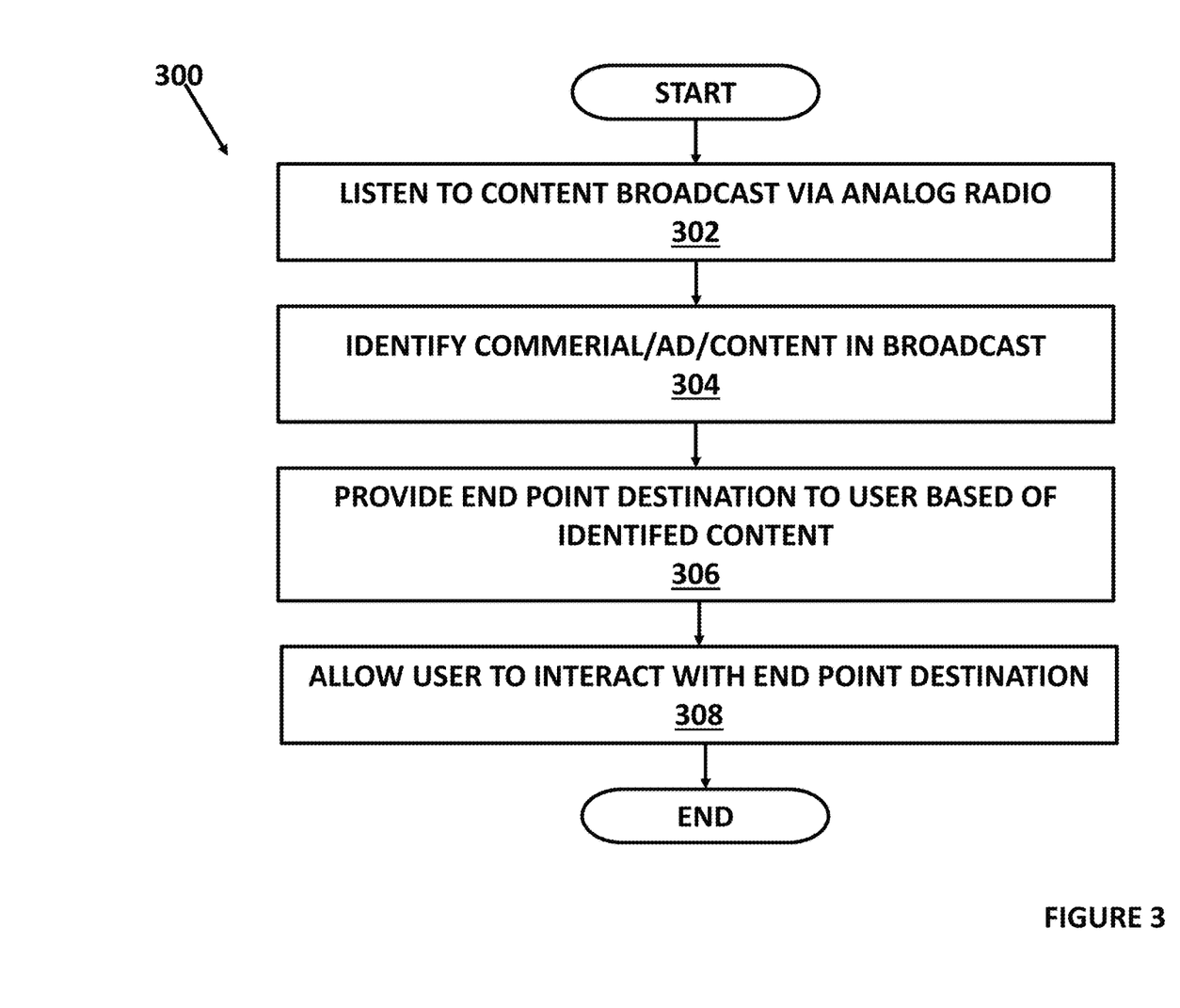
FIG. 3 illustrates a digital marketing method for an analog radio broadcast.

FIG. 3 illustrates a digital marketing method 300 for an analog radio broadcast. The method 300 may be performed using the system 100 shown in FIGS. 1A and 1B, but may also be performed in other manners. Furthermore, the method may be used with various analog radio systems that broadcast pieces of content including live radio stations (whether analog over the air or streaming) or archived content in which it is desirable to provide a way to provide digital marketing to the analog radio broadcast system. In the method, the user may listen to the analog radio broadcast (302) in any manner. In one embodiment, the user may use a radio station app to listen to the radio station or may listen to the analog radio station using a separate device like a transistor radio. Note that each different user may be listening to a different radio station and each radio station may be coupled to the personal ad system 106B so that end point destinations may be delivered to each user listening to each radio station.

Figure 7:
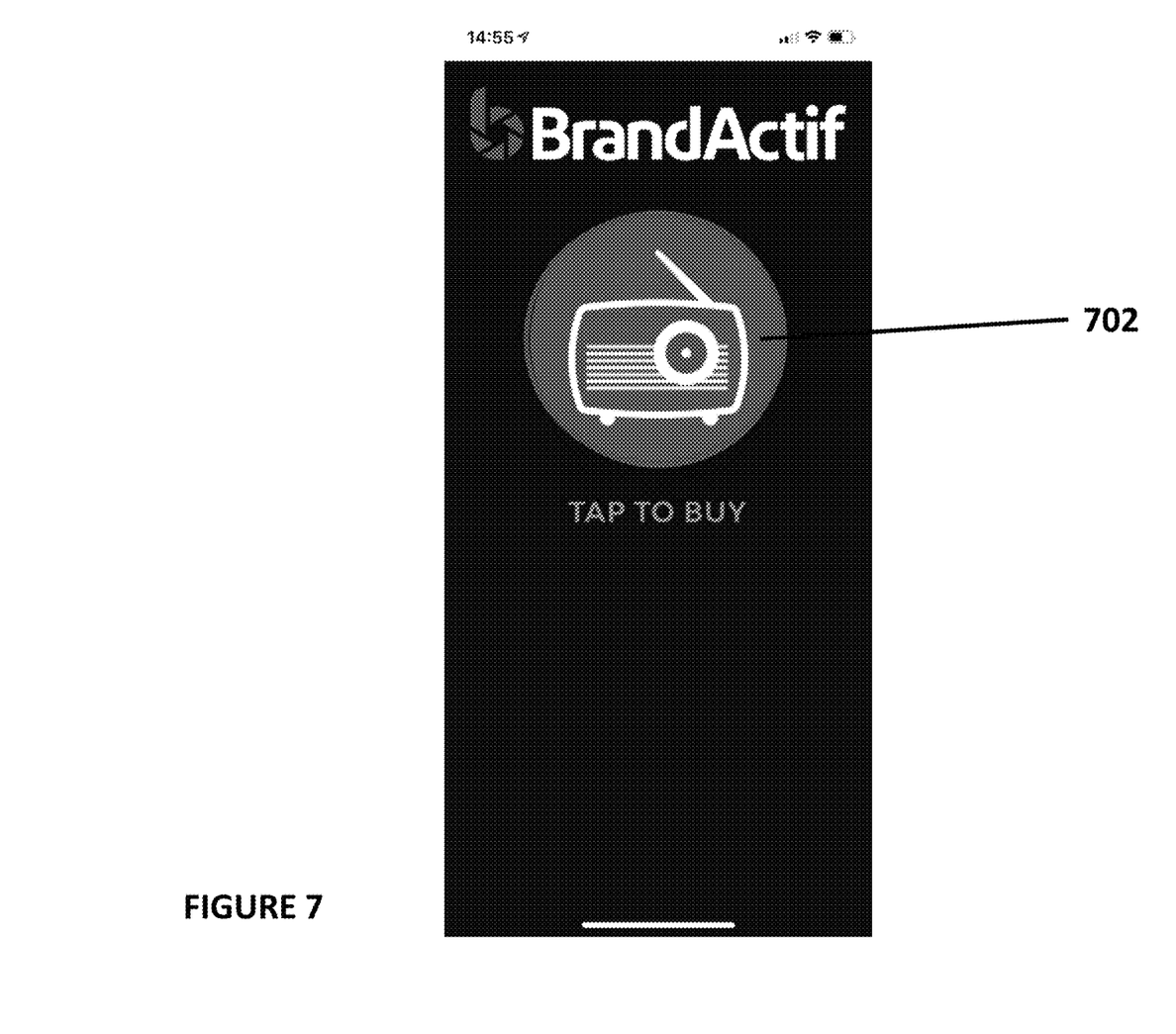
FIG. 7 illustrates an example of a user interface for the application that is part of the system shown in FIG. 1A.

While listening to the broadcast, the user may hear a piece of content (ad, promotion, discussion, article, public announcement, sponsorship, newsstory, etc.) that is "interesting" to the user. For example, the user may hear an advertisement for a particular entertainment experience, such as a baseball game/team. The user may indicate their interest in the piece of content in the broadcast (304). In one embodiment, the user may use the radio station app/PWA app 102A to indicate the interest in the piece of content and may click on an icon in the app (an example of which is shown in FIG. 7).

The interest by the user may be communicated over the communications path 104 to the backend digital marketing system 106B. As described above, for this broadcast system, the backend digital marketing system 106B has the playlist for the broadcast with the different pieces of content and has one or more end point destinations for each piece of content. The end point destinations will be moved based on timing and all of the end point destinations will be pre-programmed based on the playlist (songs and adverts), live interviews and news/sport/traffic bulletins. In some embodiments, the application/PWA stores metadata about the user and the computing device (time, SKU, location, handset, language, version, OS, browser etc.) so that the system may serve content personalized/relevant to each user if such content is available from the radio station/end point destination. For example, if the user indicates his interest in a particular product that is part of the radio broadcast at a particular location near a store for the product (known from the metadata), the application/PWA can direct that particular user to the store for the product thus increasing the foot traffic at the store. Thus, the backend may provide the end point destination to the user (306) back to the computing device. In some embodiments, the application/native application may store the database of content and end point destination associations (instead of being stored in the backend) and thus select the end point destination for a particular piece of content.

The user may then interact with the end point destination and receive information about the service or product or piece of content (308). In one embodiment, the user can purchase a product or service based on the end point destination using the radio station app/PWA. For example, the user may be listening to national radio and an advertisement is broadcast for a particular product. The user can express an interest in the advertisement and the product and the application/PWA may direct the user straight to that product on the brand/retailer's website/app. Furthermore, based on the metadata captured via the computing device, the application/PWA can inform the user of the nearest store for the particular product based on the GPS positioning of the current location of the computing device when the user expressed the interest in the product.

In some embodiments, the app 102A may be distributed by (or on behalf of) the broadcast system and may have a single icon for each user that each user can customize via the computing device app 102A. In one commercial embodiment, the app 102A may be a 'RaydioActif' app. In another embodiment, each car manufacturer may already have its own app in Car Play/Auto and the personalized offer functionality may be added into that existing app and the car manufacturer may do the deals with the local country radio stations for a revenue share. The above embodiment provides a completely new revenue stream for the auto industry and the radio stations.

Figure 4:
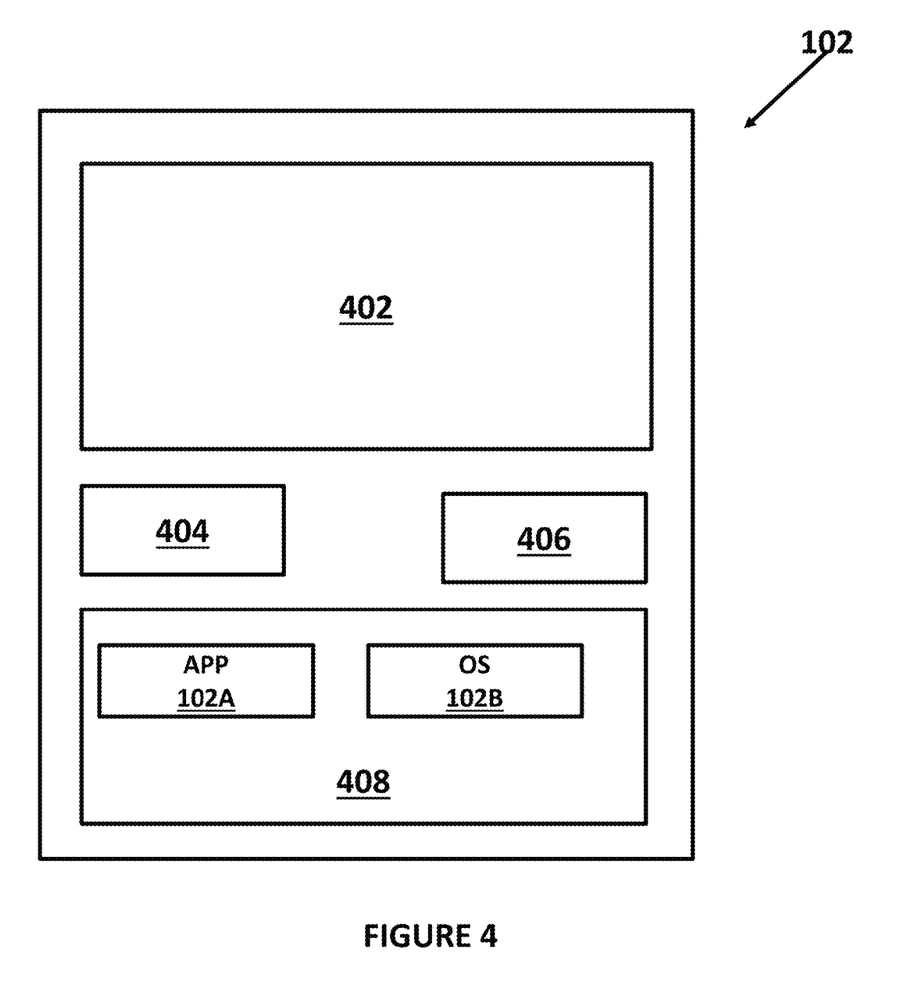
FIG. 4 illustrates more details of the computing device shown in FIG. 1A.

FIG. 4 illustrates more details of the computing device 102 shown in FIG. 1A that has a display 402, a processor 404, connectivity circuits 406 and memory 408 that are connected together as is known in the art. Each computing device may also have the app 102A and an operating system 102B that reside in the memory 408 and have a plurality of lines of instructions/computer code that are executed by the processor 404 of the computing device 102. The functions and operations of the app 102A are described above. As described above, the app 102A may be a progressive web app (PWA) that is a web application that can be saved to the homescreen of the computing device. A PWA is a known technology that is described in more detail at //developers.google.com/web/progressive-web-apps/ and //en.wikipedia.org/wiki/Progressive_Web_Apps, both of which are incorporated herein by reference. The app may also be an application downloaded to the computing device. While the computing device 102 and the PWA are known technology, the disclosed radio personalized offer system and method using the computing device and PWA are not known in the marketing or digital marketing industry. Each computing device 102 may also have an input device, such as a touchscreen, keyboard, mouse, etc. that allows the user to interact with the computing device 102 and the app 102A to, for example, indicate a piece of content of interest in the broadcast and select one of the one or more personalized offers provided to the user.

Figure 5:
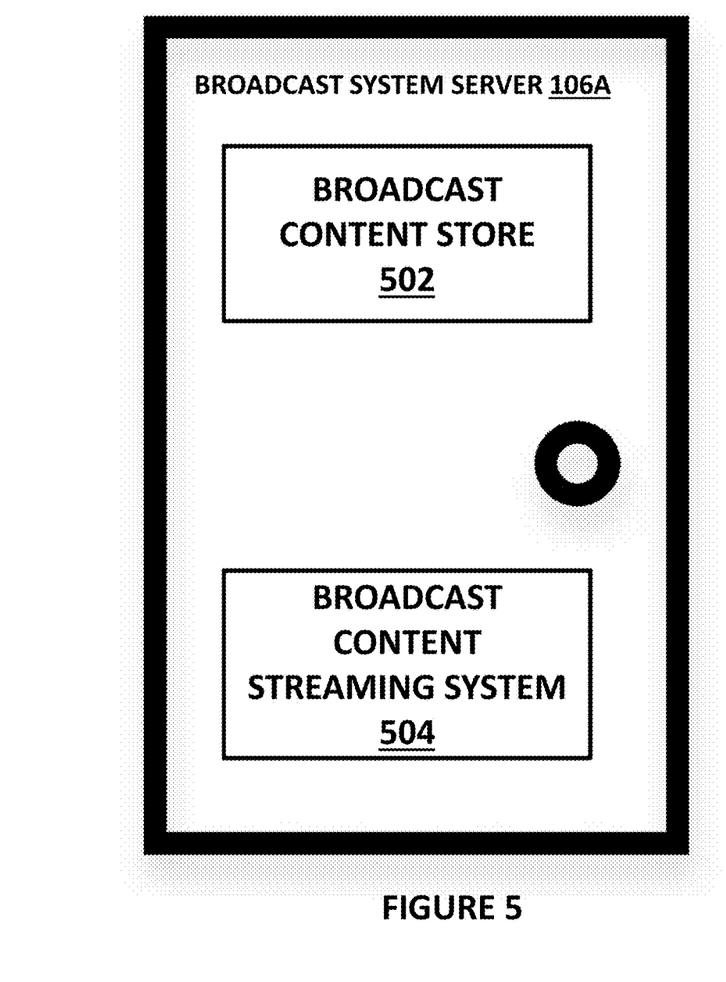
FIG. 5 illustrates more details of the radio system server shown in FIG. 1A.

FIG. 5 illustrates more details of the broadcast system server 106a shown in FIG. 1A that streams or broadcasts content, such as radio station data, to the user and the radio station app in one embodiment. The broadcast system 106A may include one or more computing resources, such as a server computers, blade servers, cloud computing resources, etc. and may further include a store for the content 502 to be broadcast (if the broadcast content is not live) and a broadcast content streaming system 504 connected to the store 502 that streams or broadcasts the content to each user through the app 102A. The broadcast content streaming system or the broadcast content store 502 may also communicate the playlist/programme to the backend 106B as described above.

Figure 6:
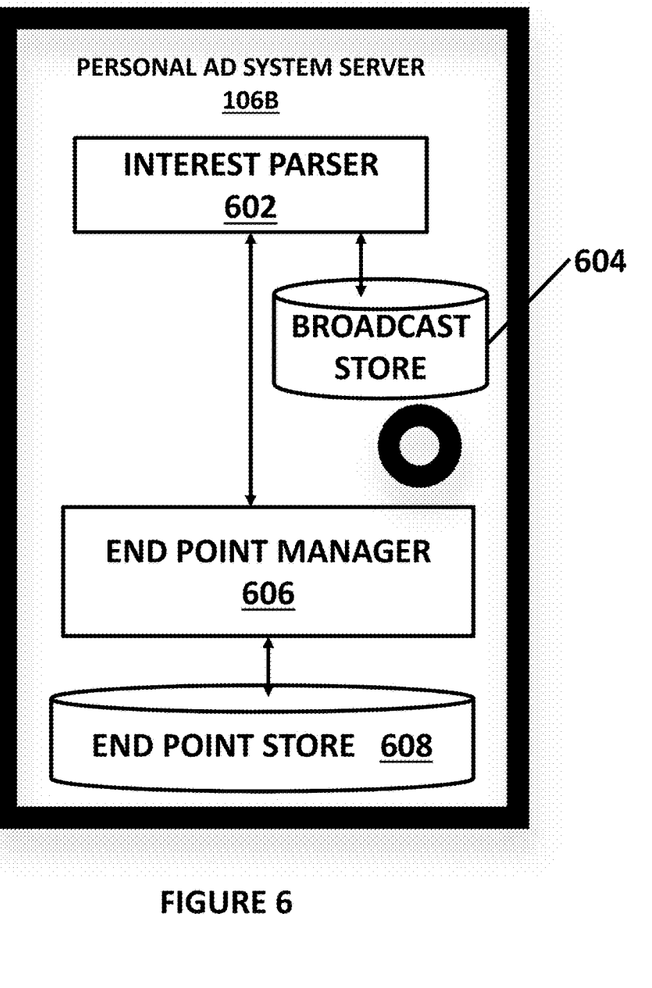
FIG. 6 illustrates more details of the personal ad system server shown in FIG. 1A.

FIG. 6 illustrates more details of the personal ad system server 106B shown in FIG. 1A. The personal ad system 106B may include one or more computing resources, such as a server computers, blade servers, cloud computing resources, etc. and may further include an interest parser 602 that receives an indication of interest for a particular piece of content from a user listening to the broadcast using the app/PWA when the end point destination for the particular piece of content is active and, using timestamping and a broadcast store 504 in one embodiment, determines, for each user, the end point destination identified by the user in each broadcast signal, such as a radio signal. The system 106B may have an end point destination manager 606 that receives the determined interest for each user and, using an end point destination store 608, selects the one or more end point destinations that may be returned to the user. In one embodiment, each broadcast station may have its own set of offers that may be selected.

FIG. 7 illustrates an example of a user interface for the application. The application or PWA may display the user interface shown in FIG. 7 during the live broadcast of the radio station. The user may indicate/express an interest in a discrete piece of content being broadcast by the radio station by tapping on a user interface element 702 such as the one shown. The result of tapping the user interface element is the delivery of the end point destination of the particular piece of content as described above. Further, as described above, when a different discrete piece of content is being broadcast by the radio station, tapping on the same user interface element results in the end point destination for the different discrete piece of content being communicated to the application.

Use Cases for Broadcast System and Method

The broadcast system and method may be used for various different types of content that may each have an end point destination associated with the piece of content. For example, the piece of content may be a product placement in a radio show in which the end point destination allows the user to tap/select for further information or to buy the product. The piece of content may also be advertising/clickable advertising in which the end point destination allows the user to tap/select for further information or to buy the product. In an example in which the broadcast is a broadcast or music by an artist, the end point destination allows the user to tap/click/select to learn more about the song or artist, go to artist's page/Spotify channel/YouTube/Vevo/T-Series/merchandise/tour tickets/social media channels etc. In an example in which the broadcast content is a movie review, the end point destination may allow the user to click/tap/select when listening to commentary to view trailer, book cinema tickets etc. In an example in which the broadcast content is commentary, such as sports talk, the end point destination allows the user to select/tap/click to receive further information about the team/player/tournament mentioned in the commentary.

In an example in which the broadcast is a news program, the end point destination allows the user to select/tap/click to read local/national news, watch local/national news channel. For a public service announcement about a disaster or disaster preparation being broadcast, the end point destination may take a person to an evacuation route for the particular user based on the location of the user. For a podcast broadcast, the end point destination allows the user to tap/click/select for further information, access educational/political/scientific information about the podcast subject and idea mentioned in the podcast. For a public information broadcast, the end point destination allows the user to tap/click/select for further information, access further information/download documents to the computing device about the public information being broadcast. For an interview broadcast, the end point destination allows the user to tap/click/select to watch behind the scenes footage, tap to learn more about individual/group/team, etc. For a sponsor message broadcast, the end point destination allows the user to tap/click to buy, tap to view further information, tap to contact about the sponsor. For a competition/giveaway content broadcast, the end point destination allows the user to tap/click to signup/enter/win the competition/giveaway.

For a translation broadcast, the end point destination allows the user to tap/click to hear an ad in Hindi, tap to translate into any particular language (known via user's handset). For a live call in program, the end point destination allows the user to tap/click to record question/phone in and thus upload a comment/question for inclusion in the live programme. The end point destination may also allow the user to tap to review—e.g. upload comment/media file/content for curation or tap to comment on social media—go straight to relevant page on social media channel. The end point destination may also allow the user, for gambling content, to tap to place a bet or see odds for a bet.

As described above, the system and method sync the play list of a commercial broadcast station such that each advert/article/discussion/promotion/sponsor message, etc. are known to the back end 106B and can be interacted with by the user using the end point destinations. Furthermore, the app/PWA may be integrated through the 'Apple Car Play' or 'Android Auto' controls of the major Car Manufacturers. In this instance, the system can create a 'buy now' button of the (for example) Audi button in the Car Play/Auto screen of the car so that, when a listener likes an advert, the audio button can be pressed and the special offer/information is sent directly to the user's phone in a single click. A further embodiment of this is via a Bluetooth connection rather than Car Play/Auto. A key aspect for Advertisers/Broadcasters here is that the same back end interface will control scanning an image or video, screen shooting an image or video, applying a visual 'buy now' button to a video and time-stamping from radio. So, any brand visual or audio can now be shoppable in anonymity, should the user so desire, without being 'pushed' by the brand, Broadcaster or Publisher.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The system and method of the present disclosure may for example be applied to digital radio broadcasts as well as analog and digital broadcasts of television shows, programs and the like. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers 20 Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:
1. A method, comprising:
providing a plurality of broadcast systems, each broadcast system broadcasting through at least one station using an analog or digital signal by an analog radio station system or digital radio station system or television station system, wherein each station schedules sequences of discrete pieces of content for broadcast by the station according to a play list;
uploading, by each broadcast system, the play list for each station of each broadcast system using a unique station identifier, the playlist having a start time and an end time for each piece of discrete content and a station identifier for the station scheduled to broadcast the discrete pieces of content in the play list;

providing a backend system configured to access and store each of the play lists and store at least one end point destination for each discrete piece of content in each of the play lists;

providing an app associated with a particular station, the app having a station identifier for the particular station that links the app to the uploaded playlist for the particular station;

downloading the app for the particular station to a computing device of a user;

expressing, by the user using the downloaded app associated with the particular station while a piece of content is being broadcast by the particular station, an interest in the broadcast piece of content of the particular station wherein the expressed interest data includes the station identifier for the broadcast piece of content, wherein the station identifier of the play list identifies the expressed interest of the user in the broadcast piece of content of the particular station without capturing data from the broadcast signal, wherein the piece of content is broadcast by a device separate from the computing device;

communicating the interest in the broadcast piece of content to the backend system via the computing device;

identifying at the backend system, the broadcast piece of content using the station identifier of the broadcast piece of content provided by the computing device and a timestamping of the interest occurring between the start time and the end time of the broadcast piece of content;

selecting, in the backend system using the identified broadcast piece of content, an end point destination associated with the broadcast piece of content, the end point destination being a pointer to further digital information about the broadcast piece of content;

communicating, by the backend system to the computing device, the end point destination for the broadcast piece of content; and accessing, using the computing device and the end point destination, the further digital information about the broadcast piece of content.

2. The method of claim 1 further comprising providing, by a digital marketing system in the backend system connected to the computing device, a personalized offer associated with the broadcast piece of content and displaying, on a display of the computing device, the personalized offer to the user.

3. The method of claim 1 further comprising activating the end point destination for each discrete piece of content at the start time for each discrete piece of content in the playlist and deactivating the end point destination for each discrete piece of content at the end time for each discrete piece of content in the playlist and wherein expressing interest for the broadcast piece of content further comprises expressing interest in the discrete piece of content while the end point destination for the discrete piece of content is active.

4. The method of claim 1, wherein the broadcast is selected from a group consisting of an analog radio or television broadcast, a streamed radio or television broadcast and an archived broadcast.

5. The method of claim 4, wherein expressing the interest using the app further comprises using one of a progressive web application (PWA) or an application downloaded to the computing device.

6. The method of claim 1, wherein the end point destination is a uniform resource locator (URL) to a webpage having digital information about the broadcast piece of content or content in an application having digital information about the broadcast piece of content.

7. The method of claim 1, wherein the device that plays the radio signal of the analog radio station is a transistor radio.

8. A system, comprising:

a plurality of broadcast systems, wherein each broadcast system broadcasts through at least one station using an analog or digital signal by an analog radio station system or digital radio station system or television station system, wherein each station schedules sequences of discrete pieces of content for broadcast by the station according to a playlist and wherein each of the discrete pieces of content is not embedded with a station identifier;

a backend system connected to the plurality of broadcast systems and configured to access and store each of the playlists and store at least one end point destination for each piece of content in the playlist, wherein the backend system is configured to receive the playlist for each station of each broadcast system using a unique station identifier, the playlist having a start time and an end time for each discrete piece of content and a station identifier for the station scheduled to broadcast the discrete pieces of content in the playlist;

a computing device having a processor and memory that downloads and executes an app that is associated with a particular station, the app having a station identifier for the particular station that links the app to the playlist for the particular station, the app having a plurality of lines of code and the processor is configured to:

express, by the user using the app associated with the particular station while a particular piece of content is being broadcast by the particular station, an interest in the broadcast piece of content wherein the expressed interest data includes the station identifier for the broadcast piece of content, wherein the station identifier in the playlist identifies the expressed interest of the user in the broadcast piece of content of the particular station without capturing data from the broadcast signal, wherein the piece of content is broadcast by a device separate from the computing device; and communicate the interest in the broadcast piece of content to the backend system;

the backend system being further configured to identify the broadcast piece of content using the station identifier of the broadcast piece of content provided by the computing device and a timestamping of the interest occurring between the start time and the end time of the broadcast piece of content and select the end point destination associated with the broadcast piece of content using the identified broadcast piece of content, the end point destination being a pointer to further information about the broadcast piece of content and to communicate the end point destination for the broadcast piece of content to the computing device; and the processor of the computing device configured to access the further information about the broadcast piece of content using the end point destination.

9. The system of claim 8, wherein the backend system further comprises a digital marketing system that provides a personalized offer associated with the broadcast piece of content and wherein a display of the computing device displays the personalized offer to the user.

10. The system of claim 8, wherein the backend system is further configured to activate the end point destination for each discrete piece of content at the start time for each discrete piece of content in the playlist and to deactivate the end point destination for each discrete piece of content at the end time for each discrete piece of content in the playlist and wherein the computing device is further configured to express interest for the broadcast piece of content while the end point destination for the discrete piece of content is active.

11. The system of claim 8, wherein the analog or digital radio or television broadcast is selected from a group consisting of a live broadcast, a streamed broadcast and an archived broadcast.

12. The system of claim 8, wherein the app executed on the computing device is one of a progressive web application (PWA) or an application downloaded to the computing device.

13. The system of claim 8, wherein the end point destination is a uniform resource locator (URL) to a webpage having digital information about the broadcast piece of content or content in an application having digital information about the broadcast piece of content.

14. The system of claim 8, wherein the device that broadcasts the radio signal of the analog radio station is a transistor radio.

15. A computing device for interacting with an analog or digital radio or television broadcast system that broadcasts a plurality of pieces of discrete content using an analog or digital signal by an analog radio station system or digital radio station system or television station system, the broadcast system having a playlist that has each piece of discrete content being broadcast, wherein each of the discrete pieces of content is not embedded with a station identifier, and the playlist for each station of each broadcast system includes a unique station identifier, the playlist having a start time and an end time for each discrete piece of content and a station identifier for the station scheduled to broadcast the discrete pieces of content in the playlist, the device comprising:

a processor and memory that downloads and executes an app that is associated with a particular station, the app having a station identifier for the particular station that links the app to the playlist for the particular station, wherein the processor is configured to:

express, by the user using the app associated with the particular station while the piece of content is being broadcast by the particular station, an interest in the broadcast piece of content of the particular station wherein the expressed interest data includes the station identifier for the broadcast piece of content, wherein the station identifier in the playlist identifies the expressed interest of the user in the broadcast piece of content of the particular station without capturing data from the broadcast signal, wherein the piece of content is broadcast by a device separate from the computing device;

communicate the interest in the broadcast piece of content to a backend system, wherein the broadcast piece of content is identified to the backend system by the station identifier of the broadcast piece of content provided by the computing device and a timestamping of the interest occurring between the start time and the end time of the broadcast piece of content;

receive an end point destination associated with the broadcast piece of content of interest, the end point destination being a pointer to further information about the broadcast piece of content and communicate the end point destination for the broadcast piece of content to the computing device; and access the further information about the broadcast piece of content using the end point destination.

16. The device of claim 15, wherein the device is further configured to display a personalized offer to the user.

17. The device of claim 15, wherein the device is further configured to express interest for the broadcast piece of content while the end point destination for the discrete piece of content is active.

18. The device of claim 15, wherein the analog or digital radio or television broadcast is selected from a group consisting of a live radio or television broadcast, a streamed radio or television broadcast and an archived radio or television broadcast.

19. The device of claim 15, wherein the app executed on the computing device is one of a progressive web application (PWA) or an application downloaded to the computing device.

20. The device of claim 15, wherein the end point destination is a uniform resource locator (URL) to a webpage having digital information about the broadcast piece of content or content in an application having digital information about the broadcast piece of content.

21. The device of claim 15, wherein the application executed on the computing device broadcasts the radio signal of the analog digital radio station.

* * * * *